(No Model.)

R. H. RICKER.
MECHANICAL TOY.

No. 265,341. Patented Oct. 3, 1882.

WITNESSES
Geo. L. Frost
William Edson

INVENTOR
Reuben H. Ricker

UNITED STATES PATENT OFFICE.

REUBEN H. RICKER, OF BOSTON, MASSACHUSETTS, ASSIGNOR OF ONE-HALF TO GEORGE G. FROST, OF SAME PLACE.

MECHANICAL TOY.

SPECIFICATION forming part of Letters Patent No. 265,341, dated October 3, 1882.

Application filed March 13, 1882. (No model.)

*To all whom it may concern:*

Be it known that I, REUBEN H. RICKER, of Boston, in the county of Suffolk and State of Massachusetts, have invented a certain new and useful Improved Mechanical Toy, of which the following is a specification.

The object of my invention is to combine a number of distinct figures or images upon a platform which is mounted upon wheels, the said figures or images being operated by links and levers which are actuated by a crank on one of the axles. This object I attain by the mechanism illustrated in the accompanying drawings, in which—

Figure 1:
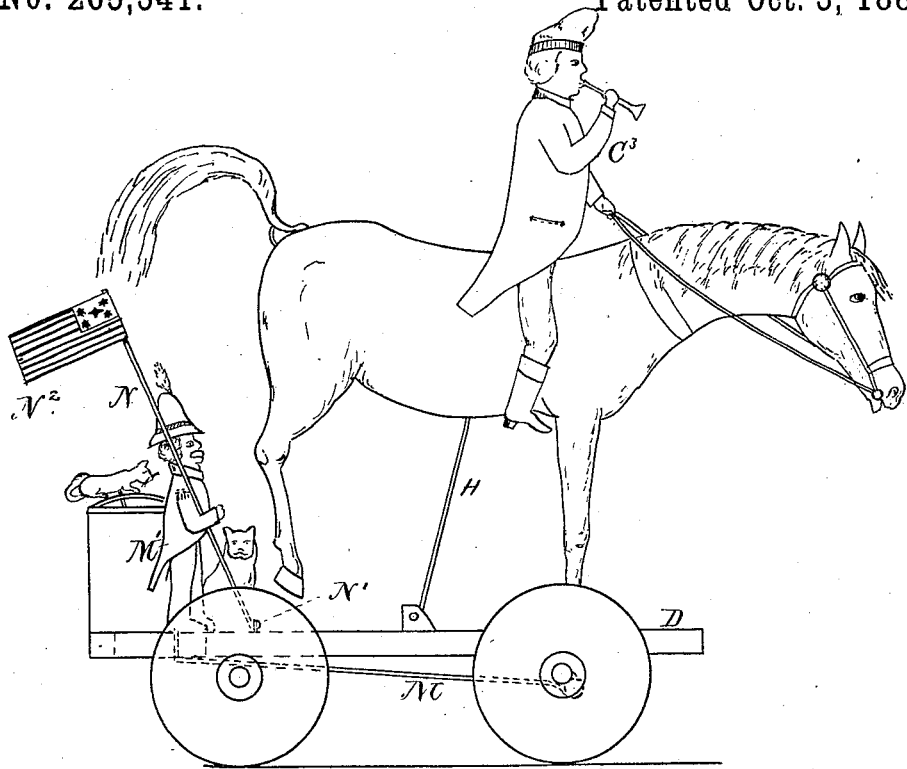
Figure 2:
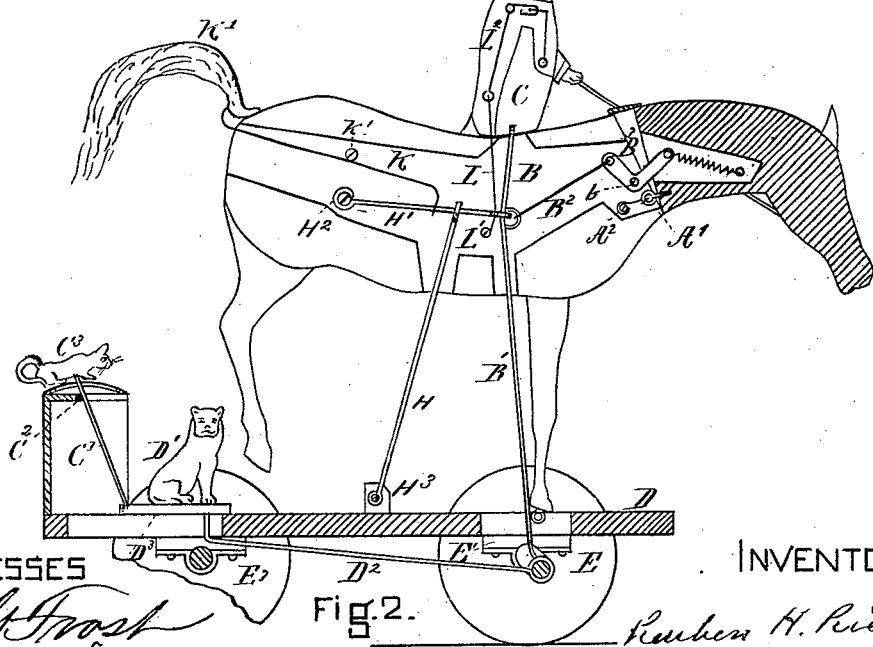

Figure 1 is a side elevation. Fig. 2 is a vertical section, also showing in elevation the method of operating the several parts.

In the drawings, D represents a platform mounted upon two pairs of wheels, E and $E^2$. The axle of the wheels E has a crank, E', formed in its center, to which crank I connect the wires that serve to operate the several images. The wire B' extends through the body of the horse to the image C, and raises and lowers it by a direct action. This wire B' is connected by an eye to the lever-wire H', said lever-wire H' being pivoted to the body of the horse at $H^2$, and has for a fulcrum an eye formed in the rod H, which is pivoted at $H^3$, so that as the wire B' descends it causes the end $H^2$ of the wire H' to rise. This throws up the rear part of the horse, and at the same time, acting through the lever K, which is pivoted at K', operates the horse's tail.

L is a cord fastened to the body of the horse at L' and connected to a wire, $L^2$, in the trumpeter's body C, as shown in Fig. 2, so as to cause the arm $C^3$, Fig. 1, to move up and down.

The head and neck A of the horse is jointed to the body by means of a link, A' $A^2$, and has a bell-crank lever, $B^3$, pivoted at b, one end of the said lever being connected to the wire B', so that as this wire B' moves up and down it will operate the head of the horse.

$D^2$ is a lever running from the crank E' back to the sliding platform $D^3$, upon which the dog D' sits, and causes the said platform and dog to slide back and forth.

C' is a wire connecting at its lower end with $D^3$ and at its upper end with the image of the cat $C^3$. This wire C' is pivoted at its lower end, and has a fulcrum at $C^2$, so that when the platform $D^3$ moves the image of the cat $C^3$ will also move.

M, Fig. 1, is a wire reaching from the crank E' to the rear part of the platform, where it turns upward and enters the body of the image M' and causes it to move back and forth. The image M' has connected to it a flag-staff, N, which is jointed to the platform D at the point N', so that as the image moves back and forward the flag $N^2$ swings.

Having thus described my invention, what I desire to secure by Letters Patent is—

1. In a mechanical toy, the combination of the crank E', the wire B', the lever H', and the fulcrum-rod H with the body of the horse, all operating together substantially as described, and for the purpose set forth.

2. In a mechanical toy, the combination of the crank E', wire B', wire $D^2$, and the bell-crank $B^3$ with the neck of the horse, all operating together substantially as described, and for the purpose set forth.

3. In a mechanical toy, the combination of the crank E', the wire B', lever H', and lever K with the tail K', all operating together substantially as described, and for the purpose set forth.

4. In a mechanical toy, the combination of the crank E' and the wire D with the platform $D^3$, lever C', and image $C^3$ and dog D', all operating together substantially as described, and for the purpose set forth.

REUBEN H. RICKER.

Witnesses:
GEO. G. FROST,
WILLIAM EDSON.